United States Patent Office 3,071,499
Patented Jan. 1, 1963

3,071,499
SALT SOLUTION DECOATING OF OPTICAL ELEMENTS
Raymond W. Boydston, 1321 Prospect Drive, Wilmington, Del., and Arthur G. Baker, Ridley Park, Pa.
No Drawing. Filed July 12, 1960, Ser. No. 42,441
2 Claims. (Cl. 134—26)

This invention relates to decoating solutions and to methods of utilizing such solutions to decoat the optical surfaces of optical media such as ordinary crown and flint glasses, barium compound glasses and rare earth glasses. A distinguishing feature of the invention is the provision of novel decoating solutions which include lithium sulfate, sodium sulfate or an equivalent. As will appear, a decoating solution of this type leaves the decoated media in a condition such that the by-products of the decoating process are readily removed by wiping or rinsing and the surface of the optical media is unmarred.

As applied to the decoating of rare earth glasses, for example, the decoating process herein disclosed is a great improvement over the present long and expensive practice of preparing holding tools having curves of the surfaces to be decoated and polishing off the coatings with polishing abrasives.

Furthermore, this new method of decoating involves the use of only one vital, essential, harmless salt ingredient in a given decoating solution which is harmless to the operator and functions to break up the coatings and form chemical by-products which are readily removed by wiping or by immersing in a by-product solvent which may be water in certain cases.

Both the coating solvent and the by-product solvent are harmless to the operator and to glasses of all compositions or other media bearing optical films. Their use requires no hood or other special equipment. This is a great improvement over the present practice of boiling the optics in concentrated sulphuric, nitric and/or hydrochloric acids for extended periods and/or boiling the same in the strongest and most corrosive of concentrated solutions containing sodium, potassium or other bases.

In its broader aspects, the present invention provides decoating solvents which include a salt of an alkali metal or an equivalent of such solvents. How such solutions are to be prepared and used is now to be explained.

A preferred decoating solvent is 40 grams of lithium sulfate ($Li_2SO_4 \cdot H_2O$) to one liter of water. All solutions of this alkali metal salt containing 30 grams/liter or above decoat all hardnesses of magnesium fluoride ($MgF_2$) from glass harmlessly. Using less concentration of the salt requires excessively long periods of time. Larger concentrations than 30–40 grams/liter do not shorten the decoating time significantly enough to justify their use.

In the use of this decoating solvent, the coated specimen is first cleaned to remove any substance which would interfere with the action of the solvent. With the decoating solution at or very near the boiling point, the coated optics are placed in the solution with all the coated surfaces freely accessible to the solution. This is sometimes accomplished by the provision of some kind of edge support. The agitation due to boiling is also advantageous. In any case, it is necessary that there be no air or vapor pockets which interfere with the free action of the solvent on the coating. Handled in this way, the above solvent decoats all hardness of magnesium fluoride from all compositions of glass or other optical media within a period of ten to forty minutes.

If the optics are removed from the decoating solution and allowed to dry without rinsing, they may appear to be ruined and the hard crystalline by-products or precipitate residue is difficult to remove without injuring the decoated surface. This difficulty is avoided by immersing the optics in water with a sloshing action, this water being heated sufficiently to prevent a too sudden change in the temperature of the optics.

It is sometimes desirable to follow ths rinsing of the optics by the use of a very mild abrasive scrub using precipitated chalk calcium carbonate, or even levigated alumina if the hardness of the glass will permit such treatment. This mild abrasive treatment is usually not necessary and should be followed by a tap water rinse.

The optics, decoated as outlined above, are finally dried and polished with a clean dry cloth.

Another solution found to be effective in the removal of magnesium fluoride films is a 20 percent solution of sodium sulfate ($NA_2SO_4$). As in the case of the lithium sulfate, the stated percent is not critical but is preferable.

Magnesium fluoride coatings are removed from all types of glass and cetrain plastics by boiling in the above sodium sulfate solution for a period of from thirty minutes to six hours depending on the hardness of the coating. Some coatings are completely removed in 30 minutes of boiling while others require two or more 30 minute treatments. No magnesium fluoride coated surface resists this treatment for more than six hours. The subsequent steps in the use of this sodium sulfate solution are similar to those set forth in connection with the above-described lithium sulfate solution.

Salt solutions of the other metals of the alkali metal group are effective to decoat one or more of the extensively used optical coatings, such as magnesium fluoride, from optical media. As a general rule, however, the lithium sulfate solution is to be preferred because of the rapidity of its action and the simplicity of the treatment subsequent to the boiling process.

An important feature of the above-described decoating solutions is that decoating takes place from the exposed surface of the optical coatings and proceeds internally into them at a uniform and constant rate. How much reduction in coating thickness takes place is a simple linear or near linear function of time. Experience has shown that partial thickness reduction of films of given initial thickness leaves a perfectly uniform lower thickness optical film. This means that the residual film still has all of the high qualities of a film originally deposited to the same thickness. Such specimens, when examined by the use of an interferometer, have been found to be perfectly uniform and without holes, irregularities or damage.

We claim:

1. A process for decoating magnesium fluoride films from an optical glass surface of an optical element, said process employing no acid solvent and comprising the steps of forming a solution by mixing between about 30 to 40 grams of lithium sulfate with about 1 liter of water, heating the solution to about its boiling point, inserting the element in the solution, maintaining the element in the solution for a period between about 10 to 40 minutes, removing the decoated element from the solution and immediately rinsing said element in water of a temperature which protects said element against breakage.

2. A process for decoating magnesium fluoride films from an optical glass surface of an optical element, said process employing no acid solvent and comprising the steps of making about a 20% aqueous solution of sodium sulfate, heating the solution to about its boiling point, inserting the element in the solution, maintaining the element in the solution for a period between about 30 to 360 minutes, removing the decoated element from the solution and immediately rinsing said element in water of a temperature which protects said element against breakage.

References Cited in the file of this patent

UNITED STATES PATENTS

| | | |
|---|---|---|
| 1,893,817 | Woodward | Jan. 10, 1933 |
| 2,032,174 | Johnson | Feb. 25, 1936 |
| 2,549,805 | Grenstad et al. | Apr. 24, 1951 |
| 2,656,289 | Miller | Oct. 20, 1953 |

OTHER REFERENCES

Hackh's "Chemical Dictonary," 3rd ed., 1944, Maple Press Co., York, Pa.